United States Patent
Nasu (10) Patent No.: US 10,572,812 B2
(45) Date of Patent: Feb. 25, 2020

(54) DETECTION APPARATUS, DETECTION METHOD, AND COMPUTER PROGRAM PRODUCT

(71) Applicant: KABUSHIKI KAISHA TOSHIBA, Tokyo (JP)

(72) Inventor: Yu Nasu, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1016 days.

(21) Appl. No.: 15/071,669

(22) Filed: Mar. 16, 2016

(65) Prior Publication Data
US 2016/0275405 A1 Sep. 22, 2016

(30) Foreign Application Priority Data
Mar. 19, 2015 (JP) .................. 2015-056412

(51) Int. Cl.
  *G06N 7/00* (2006.01)
(52) U.S. Cl.
  CPC .................. *G06N 7/005* (2013.01)
(58) Field of Classification Search
  CPC combination set(s) only.
  See application file for complete search history.

(56) References Cited

U.S. PATENT DOCUMENTS

| 4,592,085 A | * | 5/1986 | Watari ............... G10L 15/00 704/238 |
| 5,692,097 A | | 11/1997 | Yamada et al. |
| 5,704,006 A | * | 12/1997 | Iwahashi ............... G10L 13/033 704/202 |

(Continued)

FOREIGN PATENT DOCUMENTS

| JP | 2853731 B2 | 2/1999 |
| JP | 11-338492 A | 12/1999 |

(Continued)

OTHER PUBLICATIONS

IEEE The Geneva Minimalistic Acoustic Parameter Set (GeMAPS) for Voice Research and Affective Computing, Eyben et al., Published in: IEEE Transactions on Affective Computing ( vol. 7 , Issue: 2 , Apr.-Jun. 1, 2016 ), pp. 190-202 IEEE.*
International Journal of Human-Computer Studies vol. 59, Issues 1-2, Jul. 2003, pp. 157-183 The production and recognition of emotions in speech: features and algorithms, Oudeyer Pierre-Yves.*
Voice Puppetry, Matthew Brand, MERL—a Mitsubishi Electric Research Laboratory, SIGGRAPH ACM 1999, pp. 21-28.*

(Continued)

*Primary Examiner* — Michael B Holmes
(74) *Attorney, Agent, or Firm* — Foley & Lardner LLP (57) ABSTRACT

According to an embodiment, a detection apparatus detects a partial series similar to a search pattern from a parameter series including a sequence of parameters. The apparatus includes a local score acquirer, a difference score calculator, an accumulative score calculator, and a determiner. The local score acquirer is configured to acquire a local score representing a likelihood of the parameter in the search pattern for each of the parameters. The difference score calculator is configured to calculate a difference score by subtracting a threshold from the local score for each of the parameters. The accumulative score calculator is configured to calculate an accumulative score by accumulating the difference scores. The determiner is configured to compare the accumulative score with a reference value in size to determine whether the partial series is similar to the search pattern.

11 Claims, 7 Drawing Sheets

(56) References Cited

U.S. PATENT DOCUMENTS

| | | | |
|---|---|---|---|
| 7,054,811 B2* | 5/2006 | Barzilay | G06Q 30/06 704/246 |
| 7,797,160 B2 | 9/2010 | Kimura et al. | |
| 9,830,904 B2* | 11/2017 | Nasu | G10L 13/06 |
| 10,157,608 B2* | 12/2018 | Ohtani | G10L 13/033 |
| 2015/0081306 A1* | 3/2015 | Mori | G10L 13/033 704/260 |
| 2016/0275405 A1* | 9/2016 | Nasu | G10L 15/14 |
| 2016/0300564 A1* | 10/2016 | Nasu | G10L 13/06 |
| 2017/0076200 A1* | 3/2017 | Nasu | G06N 3/0472 |
| 2017/0140771 A1* | 5/2017 | Taniguchi | G10L 15/05 |
| 2017/0162187 A1* | 6/2017 | Ohtani | G10L 13/033 |

FOREIGN PATENT DOCUMENTS

| | | |
|---|---|---|
| JP | 3053512 B2 | 6/2000 |
| JP | 3114468 B2 | 12/2000 |
| JP | 4459940 B2 | 4/2010 |

OTHER PUBLICATIONS

Junkawitsch et al.; A New Keyword Spotting Algorithm With Pre-Calculated Optimal Thresholds; Proc. ICSLP, pp. 2067-2070, 1996.

Silaghi; Spotting Subsequences Matching a HMM Using the Average Observation Probability Criteria With Application to Keyword Spotting; AAAI, pp. 1118-1123, 2005.

* cited by examiner

DETECTION APPARATUS, DETECTION METHOD, AND COMPUTER PROGRAM PRODUCT

CROSS-REFERENCE TO RELATED APPLICATION

This application is based upon and claims the benefit of priority from Japanese Patent Application No. 2015-056412, filed on Mar. 19, 2015; the entire contents of which are incorporated herein by reference.

FIELD

An embodiment described herein relates generally to a detection apparatus, a detection method, and a computer program product.

BACKGROUND

Detection apparatuses have been known that detect partial series similar to designated search patterns from parameter series such as base sequences of deoxyribonucleic acids (DNAs), amino acid sequences of proteins, character strings, sequences of acoustic parameters representing voices, and music data sequences. In an example of such detection apparatuses, a similarity is calculated between a partial series in a parameter series and a search pattern, and it is determined that the partial series is similar to the search pattern when the calculated similarity exceeds a preliminarily set threshold. The similarity between the partial series and the search pattern is represented by an accumulative score obtained by accumulating all of the local scores, each of which is calculated for each of the parameters included in the partial series and represents a likelihood of the parameter in the search pattern, for example.

When a hidden Markov model is used for the search pattern, the number of parameters included in the partial series varies depending on paths in the search pattern. As a result, as the number of parameters included in the partial series becomes larger, an absolute value of the accumulative score tends to become larger. When it is unfavorable that the accumulative score varies depending on the number of parameters included in the partial series, the similarity between the partial series and the search pattern may be represented by an average score obtained by normalizing the accumulative value by the number of parameters included in the partial series. It is, however, difficult to calculate such an average score with high accuracy by simple calculation.

DETAILED DESCRIPTION

According to an embodiment, a detection apparatus detects a partial series similar to a search pattern from a parameter series including a sequence of parameters. The apparatus includes a local score acquirer, a difference score calculator, an accumulative score calculator, and a determiner. The local score acquirer is configured to acquire a local score representing a likelihood of the parameter in the search pattern for each of the parameters. The difference score calculator is configured to calculate a difference score by subtracting a threshold from the local score for each of the parameters. The accumulative score calculator is configured to calculate an accumulative score by accumulating the difference scores. The determiner is configured to compare the accumulative score with a reference value in size to determine whether the partial series is similar to the search pattern.

The following describes a detection apparatus 10 according to an embodiment in detail with reference to the accompanying drawings. The detection apparatus 10 in the embodiment aims to detect a partial series similar to a search pattern from a parameter series, which is a sequence of parameters, with high accuracy by simple calculation.

Figure 1:
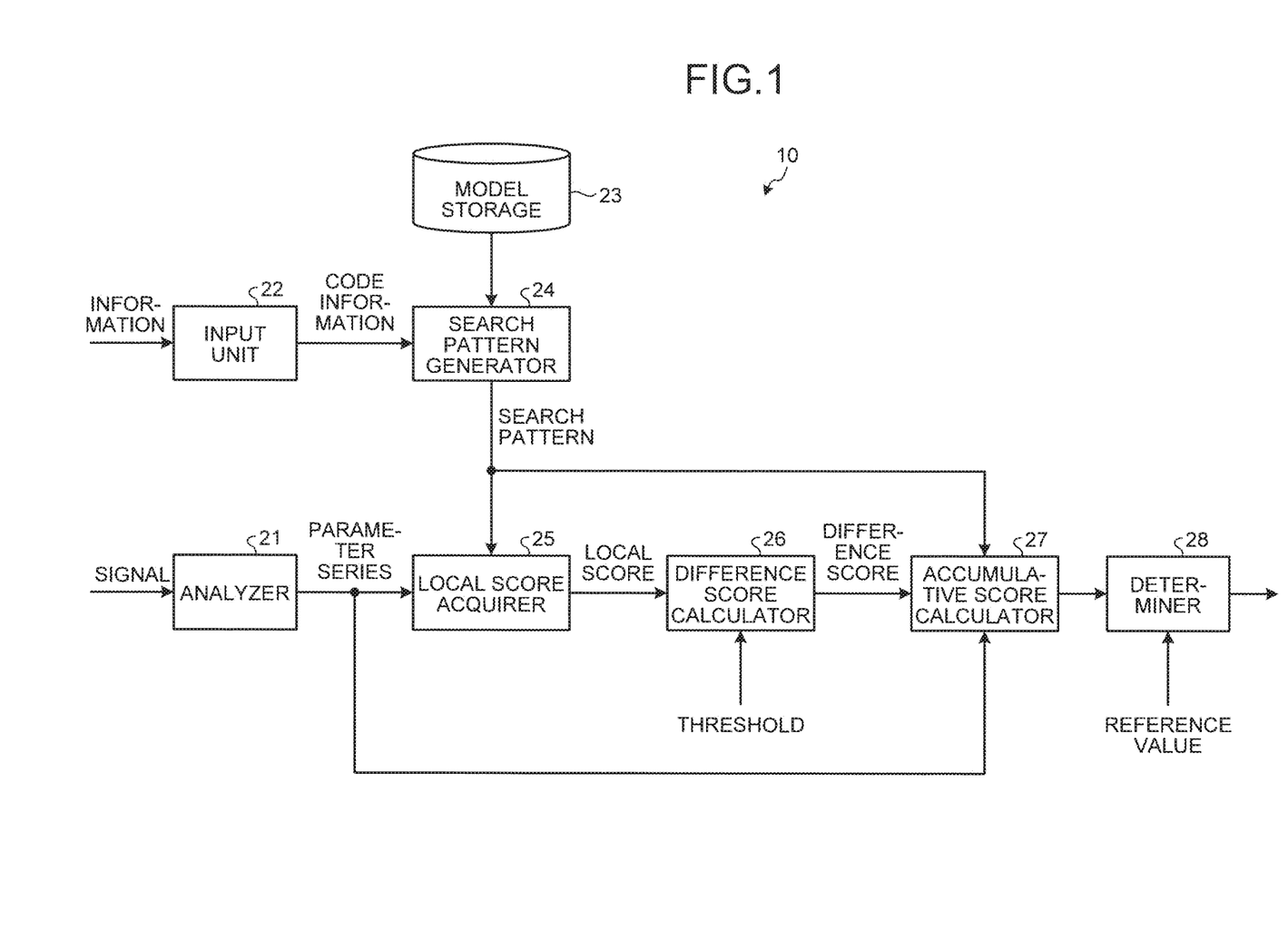
FIG. 1 is a schematic structural diagram of a detection apparatus according to an embodiment.

FIG. 1 is a schematic diagram illustrating a structure of the detection apparatus 10 in the embodiment. The detection apparatus 10 includes an analyzer 21, an input unit 22, a model storage 23, a search pattern generator 24, a local score acquirer 25, a difference score calculator 26, an accumulative score calculator 27, and a determiner 28.

The analyzer 21 receives a signal to be processed, analyzes the received signal, and generates a parameter series, which is a sequence of parameters. The analyzer 21 receives a voice signal, converts the received voice signal into a parameter series that represents an acoustic feature of the voice, and outputs the parameter series, for example. More specifically, the analyzer 21 outputs a series of mel-frequency cepstrum coefficients (MFCCs) at every fixed time period, for example. The analyzer 21 may output a parameter series continuously or sequentially from an input start time to an end time of a signal. The analyzer 21 may temporarily store all of the signals, analyze the stored signals offline, and output a parameter series, or analyze the received signal in real time and output a parameter series.

The input unit 22 acquires information input by a user, converts the acquired information into code information used for generating a search pattern, and outputs the code information. The input unit 22 acquires a keyword (character string) input by the user, converts the keyword into a phoneme sequence, and outputs the phoneme sequence, for example.

The model storage 23 stores therein a model used for generating the search pattern from the code information. The model storage 23 stores therein an acoustic model in which the phoneme sequence and a hidden Markov model (HMM) are in association with each other, for example.

The HMM is a directed graph that includes a plurality of states and transitions between the states. In the HMM, parameters and output probabilities of the parameters are allocated to each state. In the HMM, a transition probability may be allocated to each transition. The model storage 23 stores therein an acoustic model generated using a Gaussian mixture model (GMM) or a neural network, for example. The output probability of the parameter is a logarithmic likelihood when the model is generated using the GMM, for example. The output probability of the parameter is a logarithmic posterior probability when the model is generated using the neural network, for example. The output probability of the parameter may be calculated using another yardstick. The model stored in the model storage 23 is not limited to the HMM. The model storage 23 may store therein a model using another directed graph.

The search pattern generator 24 refers to the model stored in the model storage 23 and generates the search pattern corresponding to the code information from the input unit 22. The search pattern generator 24 refers to the acoustic model stored in the model storage 23 and generates the HMM corresponding to the phoneme sequence from the input unit 22, for example. In the embodiment, the search pattern generator 24 generates a left-to-right HMM as the search pattern. The search pattern generated by the search pattern generator 24 is not limited to the left-to-right HMM. The search pattern generator 24 may generate another type of HMM as the search pattern.

The local score acquirer 25 extracts a partial series from the parameter series output from the analyzer 21. The local score acquirer 25 acquires a local score that represents a likelihood of the parameter in the search pattern for each of the parameters included in the extracted partial series. For example, when the search pattern is the HMM, the local score acquirer 25 acquires an output probability corresponding to each parameter included in the extracted partial series for each of the states in the HMM, and outputs the output probability as the local score of the parameter at the state.

The difference score calculator 26 receives a threshold preliminarily set by the user, for example. The difference score calculator 26 calculates a difference score by subtracting the preliminarily set threshold from the local score for each of the parameters included in the extracted partial series. For example, when the search pattern is the HMM, the local score acquirer 25 calculates the difference score by subtracting the preliminarily set threshold from the local score corresponding to each parameter included in the extracted partial series for each state in the HMM.

The accumulative score calculator 27 calculates an accumulative score by accumulating the difference scores of the respective parameters included in the partial series. For example, when the search pattern is the HMM, the accumulative score calculator 27 calculates the accumulative score by accumulating the difference scores of the parameters coinciding with the partial series for each path in the HMM. When the transition probabilities are allocated to the respective transitions in the HMM, the accumulative score calculator 27 adds the transition probabilities allocated to the transitions along the path to the accumulative score.

The determiner 28 receives a preliminarily set reference value. The determiner 28 compares the accumulative score calculated by the accumulative score calculator 27 with the reference value in size to determine whether the partial series is similar to the search pattern. For example, when the search pattern is the HMM, the determiner 28 compares the accumulative score with the reference value in size to determine whether the partial series is similar to the search pattern for each path in the HMM. Thereafter, the determiner 28 outputs the determination result to the outside.

The threshold preliminarily set by the user, for example, is a boundary value of the accumulative score for determining whether the partial series is similar to the search pattern. The threshold may be appropriately adjusted by the user, for example. The threshold may be changed depending on the received keyword, for example. The reference value is zero, for example. The reference value is not limited to zero. The reference value may be a value near zero.

Figure 2:
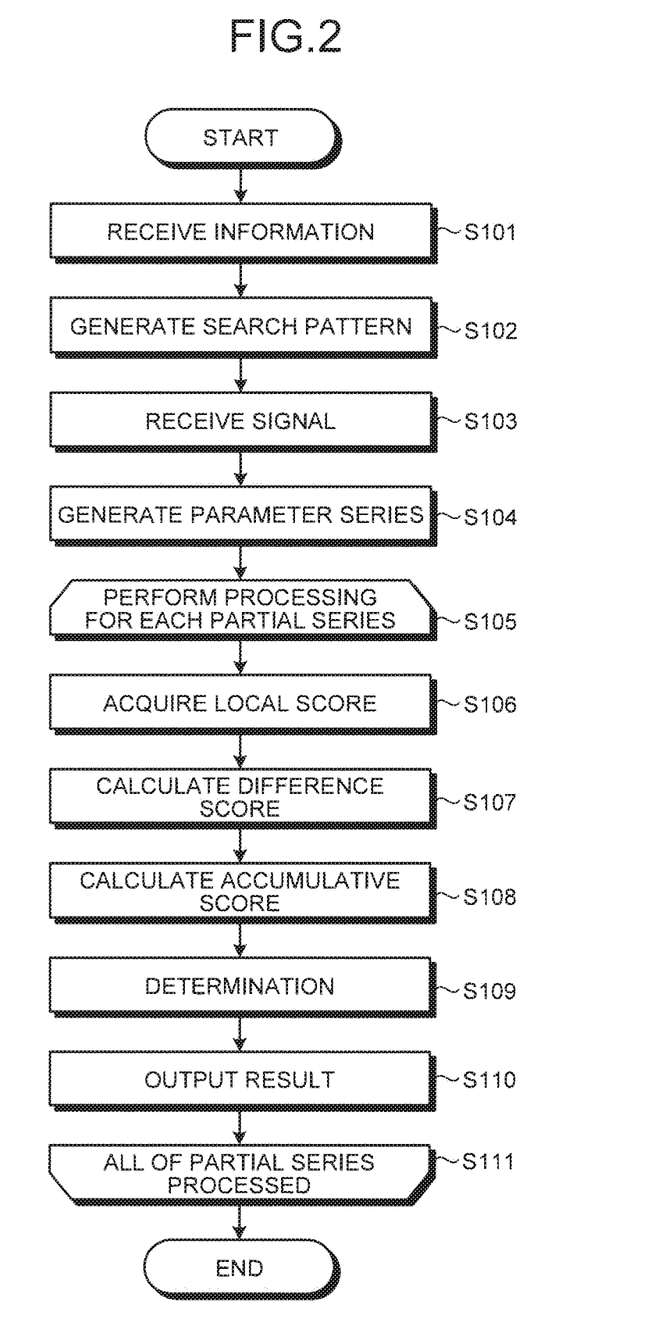
FIG. 2 is a flowchart illustrating a processing procedure performed by the detection apparatus according to the embodiment.

FIG. 2 is a flowchart illustrating a processing procedure performed by the detection apparatus 10 in the embodiment. The detection apparatus 10 performs the processing in accordance with the procedure illustrated in FIG. 2.

At step S101, the input unit 22 acquires the information, converts the acquired information into the code information used for generating a search pattern, and outputs the code information. For example, the input unit 22 acquires a keyword (character string), converts the keyword into a phoneme sequence, and outputs the phoneme sequence.

At step S102, the search pattern generator 24 refers to the model stored in the model storage 23 and generates the search pattern corresponding to the code information from the input unit 22. For example, the search pattern generator 24 refers to the acoustic model stored in the model storage 23 and generates the HMM corresponding to the phoneme sequence from the input unit 22.

At step S103, the analyzer 21 receives a signal to be processed. For example, the analyzer 21 receives a voice signal. At step S104, the analyzer 21 analyzes the received signal to generate a parameter series. For example, the analyzer 21 converts the received voice signal into a parameter series that represents an acoustic feature of the voice.

The local score acquirer 25 extracts a partial series from the parameter series output by the analyzer 21 and causes the extracted partial series to be subjected to the processing from step S106 to step S110 for each of the extracted partial series (loop processing between step S105 and step S111).

At step S106, the local score acquirer 25 acquires the local score that represents a likelihood of the parameter in the search pattern for each of the parameters included in the extracted partial series. For example, when the search pattern is the HMM, the local score acquirer 25 acquires the output probability corresponding to each parameter included in the extracted partial series for each of the states in the HMM, and outputs the output probability as the local score of the parameter at the state.

At step S107, the difference score calculator 26 calculates the difference score by subtracting the preliminarily set threshold from the local score for each of the parameters included in the extracted partial series. For example, when the search pattern is the HMM, the local score acquirer 25 calculates the difference score by subtracting the threshold from the local score corresponding to each parameter included in the extracted partial series for each state in the HMM.

At step S108, the accumulative score calculator 27 calculates the accumulative score by accumulating the difference scores of the respective parameters included in the partial series. For example, when the search pattern is the HMM, the accumulative score calculator 27 calculates the accumulative score by accumulating the difference scores of the parameters coinciding with the partial series for each path in the HMM.

At step S109, the determiner 28 compares the accumulative score with the reference value in size to determine whether the partial series is similar to the search pattern. For example, when the search pattern is the HMM, the determiner 28 compares the accumulative score with the reference value in size to determine whether the partial series is similar to the search pattern for each path in the HMM.

At step S110, the determiner 28 outputs the determination result to the outside. The determiner 28 determines whether all of the partial series have been subjected to the processing (step S111). If it is determined that all of the partial series are not yet subjected to the processing, the determiner 28 causes the processing to return to step S106, at which the next partial series is subjected to the processing. If it is determined that all of the partial series have been subjected to the processing, the determiner 28 causes the flow to end.

The detection apparatus 10 in the embodiment can detect whether the partial series included in the parameter series is similar to the search pattern, as described above. For example, the detection apparatus 10 can detect whether the partial series included in the parameter series is similar to a path defined by the HMM.

Figure 3:
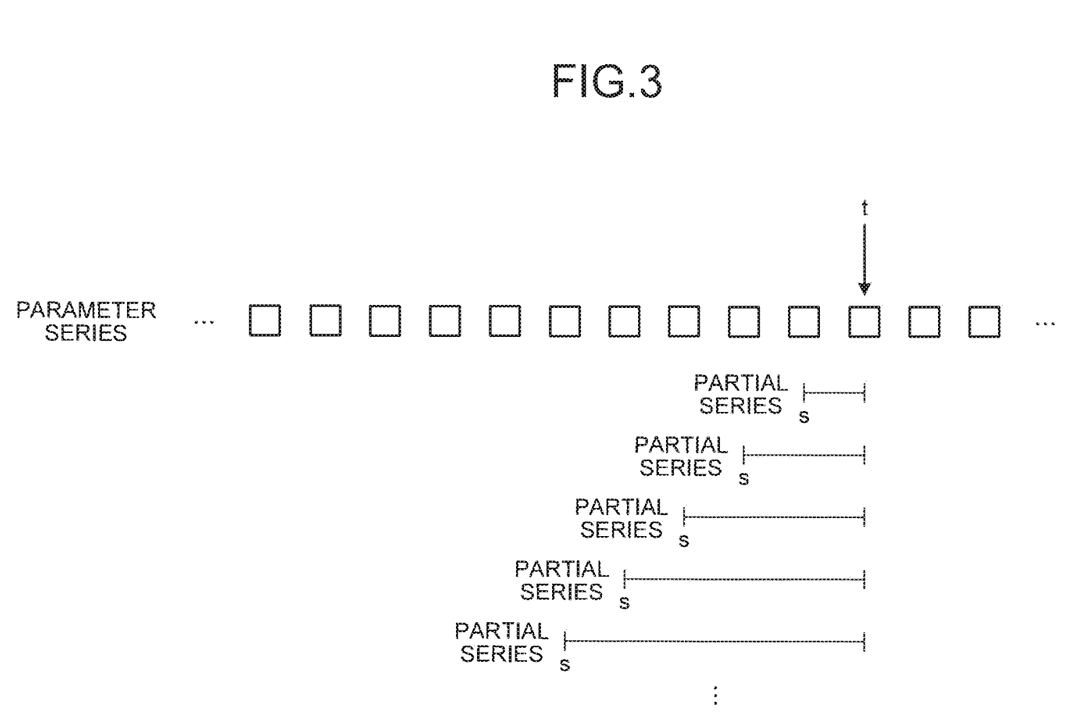
FIG. 3 is a schematic diagram illustrating positions of partial series having the ends at an index t.

FIG. 3 is a schematic diagram illustrating the positions of the partial series having the ends at an index t in the parameter series. When the search pattern is the HMM, the detection apparatus 10 may identify a certain parameter in the parameter series and calculate a maximum accumulative score in the accumulative scores of all of the partial series in each of which the identified parameter is the end thereof. The detection apparatus 10 may compare the calculated accumulative score with the reference value in size. As a result, the detection apparatus 10 can detect that the partial series similar to the search pattern occurs at least at the identified position.

Specifically, the detection apparatus 10 performs calculation on the basis of the following Expression (1).

$$\max_{s \leq t} \max_{Q} \sum_{\tau=s}^{t} (\text{score}(\tau, q_t) - \text{THRESHOLD}) > 0 \quad (1)$$

In Expression (1), t represents the position (index) of the parameter at the end of the partial series in the parameter series and is an integer equal to or larger than one, s represents the index of the parameter at the start of the partial series in the parameter series and is an integer equal to or larger than one and equal to or smaller than t, and $\tau$ represents any index in the partial series and is an integer equal to or larger than s and equal to or smaller than t.

In Expression (1), score $(\tau, q_\tau)$ represents the output probability (local score) of the parameter at the index $\tau$ at the state with the state number $q_\tau$ in the HMM. In expression (1), THRESHOLD represents a preliminarily set threshold.

In Expression (1), Q represents the state series (path) defined by the HMM, which is the search pattern. Q is constrained by the following Equation (2).

$$Q = \{q_s, q_{s+1}, \ldots, q_e\}$$

$$q_s = 1$$

$$q_e = N$$

$$q_\tau \leq q_{\tau+1} \leq q_\tau + 1 (s \leq \tau < e) \quad (2)$$

The HMM includes N states where N is an integer equal to or larger than one. The state numbers, each of which is an integer from one to N, are allocated to the respective N states included in the HMM. The state number 1 represents the start state. The state number N represents the end state.

In Equation (2), Q represents the state series that includes the states $q_s$ to $q_e$, the number of which is any number, $q_s$ represents the start state (state with the state number 1) of the HMM, $q_e$ represents the end state (state with the state number N) of the HMM, $\tau$ is an integer equal to or larger than s and smaller than e, $q_\tau$ represents the state number of the state after ($\tau$-s) transitions from the start state, and $q_{\tau+1}$ is $q_\tau$ or $q_\tau+1$.

Equation (2) constrains Q being the state series arranged in the order of the transitions in the left-to-right HMM, and the head of the state series being the start state and the last of the state series being the end state.

In Expression (1), a value calculated by (score($\tau$, $q_\tau$)–THRESHOLD) represents a subtraction score obtained by subtracting the threshold from the output probability (local score) of the parameter at the index $\tau$ at the state with the state number $q_\tau$ in the HMM. In Expression (1), a value calculated by $\Sigma$ (score($\tau$, $q_\tau$)–THRESHOLD) represents the accumulative score obtained by accumulating the subtraction scores of the parameters coinciding with the partial series from the index s to the index t in the designated path in the HMM.

In Expression (1), the value calculated by $$\max_{Q}$$

represents a maximum accumulative score in the accumulated scores of all of the paths in the HMM, that is, all of the paths constrained by Equation (2). In Expression (1), the value calculated by $$\max_{s \leq t}$$

represents a further maximum accumulative score in the maximum accumulative scores of all of the partial series each start from s equal to or smaller than t.

In Expression (1), the maximum accumulative score finally selected in the left side and zero, which is the reference value, are compared with each other in size. In Expression (1), when the maximum accumulative score is larger than zero, it is determined that the partial series in which the identified parameter is the end is similar to the HMM.

As described above, the detection apparatus 10 can detect whether the partial series similar to the search pattern is included in all of the partial series in each of which the identified parameter is the end thereof by calculation on the basis of Expression (1).

In the HMM, a higher output probability may be allocated to a smaller value. In this case, the detection apparatus 10 performs calculation on the basis of the following Expression (3) instead of Expression (1).

$$\min_{s \leq t} \min_{Q} \sum_{\tau=s}^{t} (\text{score}(\tau, q_\tau) - \text{THRESHOLD}) < 0 \quad (3)$$

In the left side of Expression (3), the function max in Expression (1) is replaced with the function min. The function min selects a minimum accumulative score in all of the accumulative scores. In Expression (3), the minimum accumulative score and zero are compared with each other, and when the minimum accumulative score is smaller than zero, it is determined that the partial series in which the identified parameter is the end is similar to the HMM.

Figure 4:
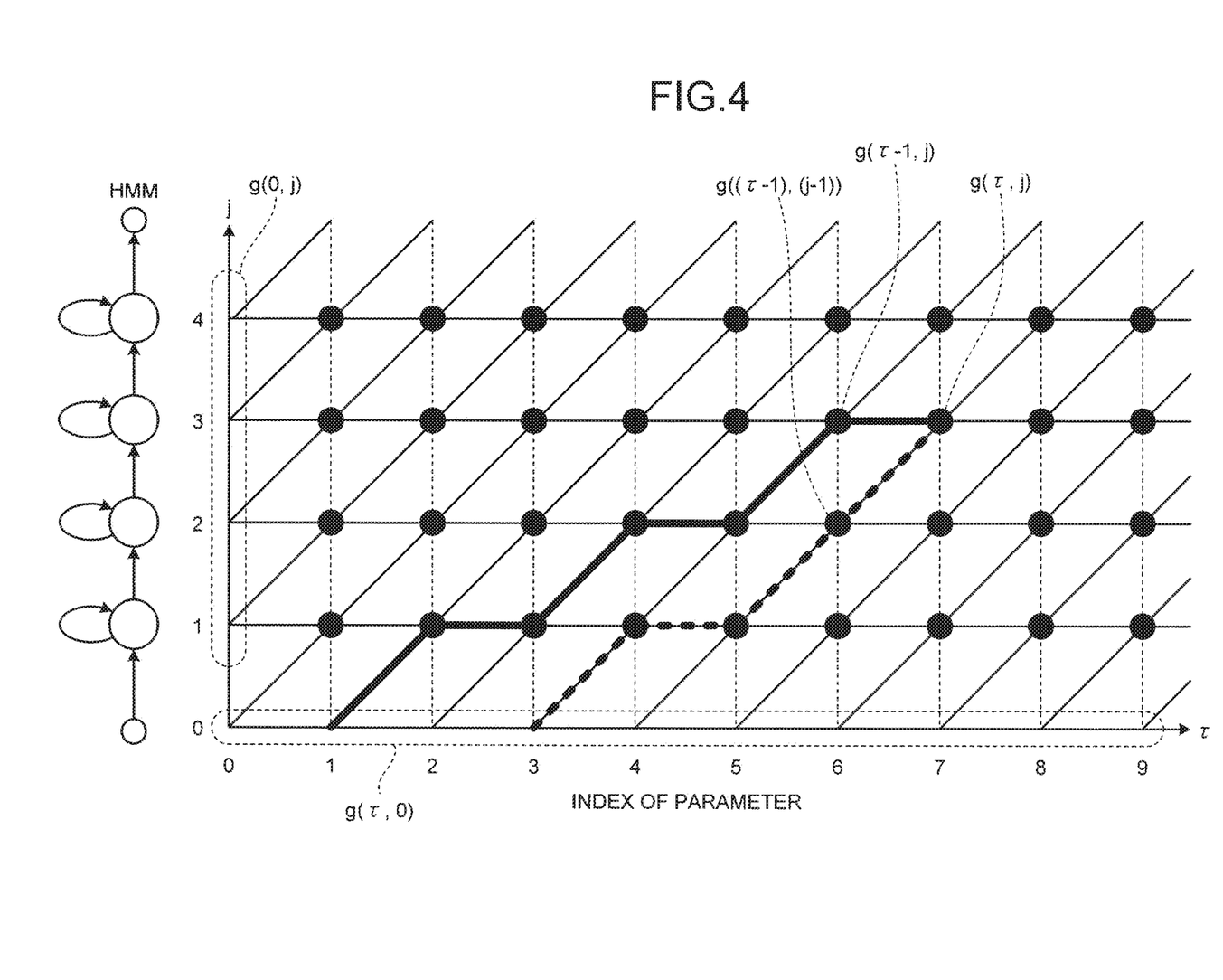
FIG. 4 is a trellis diagram illustrating an example of paths in a hidden Markov model (HMM)

FIG. 4 is a trellis diagram illustrating an example of paths in the HMM. In the trellis diagram illustrated in FIG. 4, the ordinate axis represents the state number in the HMM while the abscissa axis represents the index in the parameter series.

The detection apparatus 10 may perform the calculation of the left side of Expression (1) by a technique based on a dynamic programming (DP) (DP matching). The detection apparatus 10 may sequentially select the parameters included in the parameter series one by one from the head and calculate the maximum accumulative score for each selected parameter. Specifically, when the search pattern is the left-to-right HMM, the detection apparatus 10 calculates the maximum accumulative score on the basis of the following Equations (4), which is a recurrence formula based on a Viterbi algorithm.

$$g(0, j) = -\infty \quad (0 < j \le N) \quad (4)$$
$$g(\tau, 0) = 0 \quad (0 \le \tau \le T)$$
$$g(\tau, j) =$$
$$\max(g(\tau - 1, j - 1), g(\tau - 1, j)) + \text{score}(\tau, j) - \text{THRESHOLD}$$
$$(0 < \tau \le T, 0 < j \le N)$$

In Equations (4), $g(\tau, j)$ represents an evaluation value of the parameter at the index $\tau$ at the state with the state number j, $\tau$ is a variable that represents the index of the parameter and is an integer larger than zero and equal to or smaller than T, T is the index of the end of the parameter series, and j is a variable that represents the state number of the state in the HMM and is an integer larger than zero and equal to or smaller than N. The HMM includes N states with the state numbers 1 to N where N is an integer equal to or larger than one. The state number 1 represents the start state. The state number N represents the end state.

The first row in Equations (4) represents that the evaluation values $g(0, j)$ of the parameters at the index 0 at the states 1 to N are $-\infty$, as illustrated in FIG. 4. The second row in Equations (4) represents that the evaluation value of the parameter at the index $\tau$ at the state 0 is zero, as illustrated in FIG. 4. The state 0 represents the state before the start state.

In the third row in Equations (4), $\max(g(\tau-1, j-1), g(\tau-1, j))$ represents the function that selects the larger one of $g(\tau-1, j-1)$ and $g(\tau-1, j)$. In other words, $\max(g(\tau-1, j-1), g(\tau-1, j))$ represents a maximum evaluation value in the evaluation values of the parameter at the index $(\tau-1)$ immediately before the index $\tau$ at the states immediately before the state with the state number j (the state with the state number $(j-1)$ or the state number j in the left-to-right HMM).

In the third row in Equations (4), a value calculated by $(\text{score}(\tau, j)-\text{THRESHOLD})$ represents the subtraction score obtained by subtracting the threshold from the output probability (local score) of the parameter at the index $\tau$ at the state with the state number j. The third row in Equations (4) represents that a sum of the maximum value in the evaluation values at the states immediately before the state j and the subtraction score is the evaluation value of the parameter at the index $\tau$ at the state with the state number j, as illustrated in FIG. 4.

The detection apparatus 10 sequentially selects the parameters included in the parameter series one by one from the head and performs calculation on the basis of the third row in Equations (4).

The detection apparatus 10 determines whether the evaluation value $g(\tau, N)$ of the parameter at the index $\tau$ at the end state N is larger than zero. When the evaluation value $g(\tau, N)$ is larger than zero, the detection apparatus 10 detects that any of the partial series in which the end thereof is at the index $\tau$ is similar to the HMM. This makes it possible for the detection apparatus 10 to detect the partial series similar to the HMM more efficiently.

When the transition probabilities are allocated to the HMM, the detection apparatus 10 may add the transition probabilities allocated to the corresponding transitions to the evaluation values $g(\tau-1, j-1)$ and $g(\tau-1, j)$ at the states immediately before the state in Equations (4).

The detection apparatus 10 may perform the calculation of the left side of Expression (3) by a technique based on the dynamic programming (DP matching). In this case, the detection apparatus 10 calculates the minimum accumulative score on the basis of the following Equations (5), which is a recurrence formula based on a Viterbi algorithm.

$$g(0, j) = \infty \quad (0 < j \le N) \quad (5)$$
$$g(\tau, 0) = 0 \quad (0 \le \tau \le T)$$
$$g(\tau, j) =$$
$$\min(g(\tau - 1, j - 1), g(\tau - 1, j)) + \text{score}(\tau, j) - \text{THRESHOLD}$$
$$(0 < \tau \le T, 0 < j \le N)$$

In Equations (5), the function max in Equations (4) is replaced with the function min, and $-\infty$ is replaced with $\infty$. In this case, the detection apparatus 10 determines whether the evaluation value $g(\tau, N)$ of the parameter at the index $\tau$ at the end state N is smaller than zero.

Figure 5:
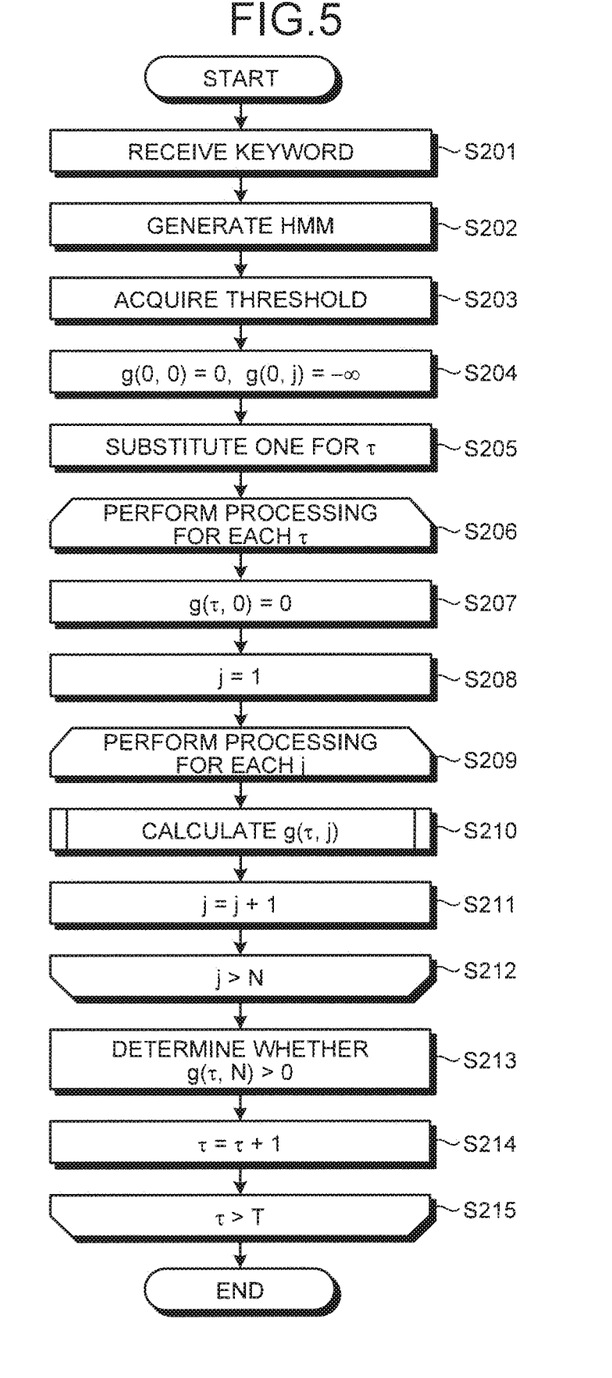
FIG. 5 is a flowchart illustrating a processing procedure performed by the detection apparatus when a dynamic programming is used.

FIG. 5 is a flowchart illustrating a processing procedure performed by the detection apparatus 10 when the dynamic programming is used. In the example illustrated in FIG. 5, a voice signal is received, and as the accumulative score becomes larger, the similarity becomes higher.

At step S201, the input unit 22 acquires a keyword (character string), converts the keyword into a phoneme sequence, and outputs the phoneme sequence. At step S202, the search pattern generator 24 generates the HMM corresponding to the phoneme sequence. At step S203, the accumulative score calculator 27 acquires a threshold (THRESHOLD).

At step S204, the accumulative score calculator 27 substitutes zero for the evaluation value $g(0, 0)$ and $-\infty$ for the evaluation value $g(0, j)$ where j is an integer equal to or larger than one and equal to or smaller than N. The accumulative score calculator 27 may substitute a minimum value that can be input instead of $-\infty$. At step S205, the accumulative score calculator 27 substitutes one for the variable $\tau$, which represents the index of the parameter.

The accumulative score calculator 27 repeats the processing from step S207 to step S214 for each variable $\tau$, that is, for each index of the parameter (loop processing between step S206 and step S215).

At step S207, the accumulative score calculator 27 substitutes zero for the evaluation value $g(\tau, 0)$. At step S208, the accumulative score calculator 27 substitutes one for the variable j, which represents the state number of the state in the HMM.

The accumulative score calculator 27 then repeats the processing from step S210 to step S211 for each variable j, that is, for each state in the HMM (loop processing between step S209 and step S212).

At step S210, the accumulative score calculator 27 calculates the evaluation value $g(\tau, j)$ of the parameter at the index τ at the state with the state number j. The processing at step S210 is further described in detail with reference to FIG. 6.

At step S211, the accumulative score calculator 27 substitutes (j+1) for the variable j. At step S212, the accumulative score calculator 27 determines whether the variable j is larger than N. If the variable j is larger than N, that is, the processing is completed at all of the states in the HMM, the accumulative score calculator 27 causes the processing to leave the loop and proceed to step S213. If the variable j is not larger than N, the accumulative score calculator 27 causes the processing to return to step S210 and to be repeated from step S210.

At step S213, the determiner 28 determines whether the evaluation value g(τ, N) of the parameter at the index τ at the state with the state number N is larger than zero, which is the reference value. The state with the state number N is the end state in the HMM. The evaluation value at the end state in the HMM is the maximum accumulative score of the path in which the parameter at the index τ is the end thereof. At step S213, the determiner 28 determines whether the maximum accumulative score of the partial series in which the parameter at the index τ is the end thereof is larger than zero, which is the reference value. If the evaluation value g(τ, N) at the state with the state number N is larger than zero, the determiner 28 determines that at least one partial series in which the parameter at the index τ is the end thereof includes the partial series similar to the search pattern, and outputs the determination result.

At step S214, the accumulative score calculator 27 substitutes (τ+1) for the variable τ. At step S215, the accumulative score calculator 27 determines whether the variable τ is larger than T. If the variable τ is larger than T, that is, the processing is performed up to the index at the last of the parameter series, the accumulative score calculator 27 causes the processing to leave the loop and the flow to end. If the variable τ is not larger than T, the accumulative score calculator 27 causes the processing to return to step S207 and to be repeated from step S207.

Figure 6:
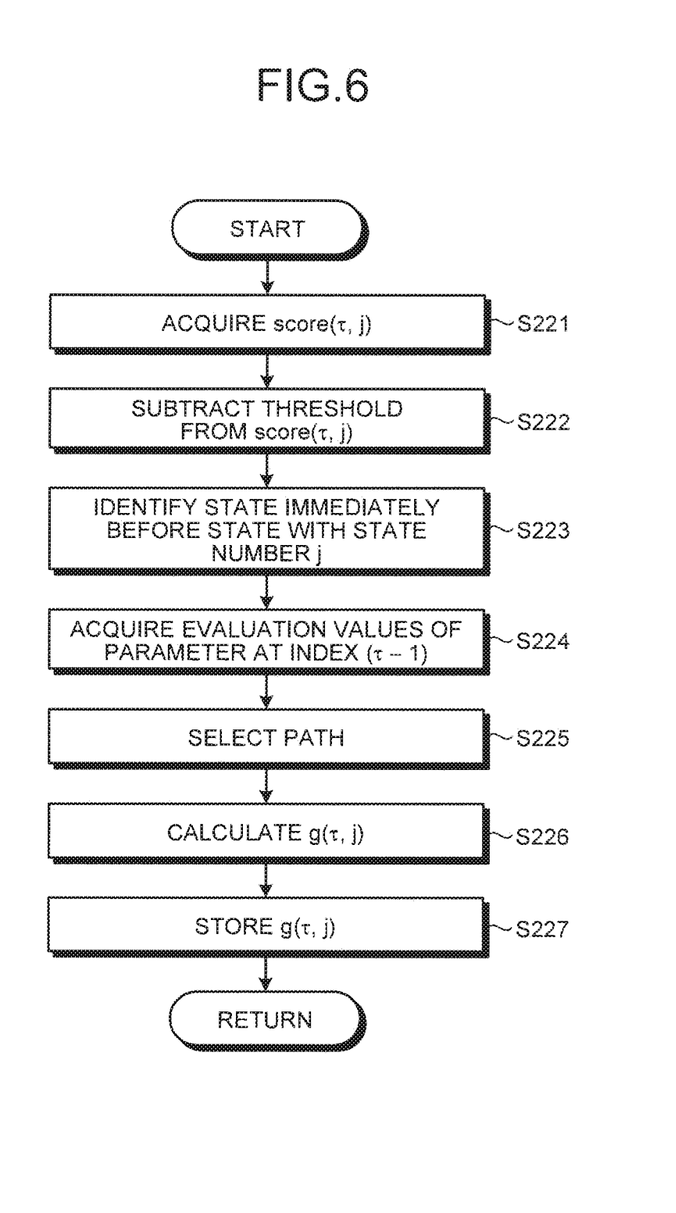
FIG. 6 is a flowchart illustrating a procedure of calculation processing of an evaluation value.

FIG. 6 is a flowchart illustrating a procedure of the calculation processing of the evaluation value g(τ, j). The detection apparatus 10 performs the processing illustrated in FIG. 6 in the evaluation value calculation processing at step S210.

At step S221, the local score acquirer 25 acquires the score(τ, j) from the HMM. Specifically, the local score acquirer 25 acquires the output probability (local score) of the parameter at the index τ at the state with the state number j.

At step S222, the difference score calculator 26 calculates (score(τ,j)−THRESHOLD). Specifically, the difference score calculator 26 calculates the difference score by subtracting the threshold from the local score of the parameter at the index τ at the state with the state number j.

At step S223, the accumulative score calculator 27 identifies the state immediately before the state with the state number j. The accumulative score calculator 27 identifies at least one state immediately before the state with the state number j while following the transitions coming to the state with the state number j in the direction opposite to the coming direction. In this example, the search pattern is the left-to-right HMM. The state immediately before the state with the state number j is, thus, the state with the state number j or the state number (j−1).

At step S224, the accumulative score calculator 27 acquires the evaluation values of the parameter at the index (τ−1), which is the index immediately before the index τ, at the states immediately before the state with the state number j. In this example, the accumulative score calculator 27 acquires the evaluation value g(τ−1, j−1) and the evaluation value g(τ−1, j).

At step S225, the accumulative score calculator 27 selects any one of the paths such that the evaluation value of the selected path is at the maximum. In this example, the accumulative score calculator 27 selects the larger evaluation value out of the evaluation value g(τ−1, j−1) and the evaluation value g(τ−1, j) at the state immediately before the state. When the transition probabilities are allocated to the HMM, the accumulative score calculator 27 selects the maximum evaluation value after adding the corresponding transition probabilities to the evaluation values at the state immediately before the state.

At step S226, the accumulative score calculator 27 adds the evaluation value g(τ−1, j−1) or the evaluation value g(τ−1, j), which is the evaluation value at the state immediately before the state with the state number j in the selected path, to the difference score calculated at step S222 to calculate the evaluation value g(τ, j) of the parameter at the index τ at the state with the state number j.

At step S227, the accumulative score calculator 27 stores the calculated evaluation value g(τ, j).

At step S227, the accumulative score calculator 27 may store the index of the parameter at the start state in the selected path together with the evaluation value. In this case, at step S213, the determiner 28 may output the index of the parameter stored in correspondence with the evaluation value together with the determination result of the partial series similar to the search pattern being included. As a result, the determiner 28 can identify the start position and the end position of the partial series similar to the search pattern in the parameter series.

As described above, the detection apparatus 10 in the embodiment calculates the accumulative score by accumulating the difference scores of the respective parameters included in the partial series. The difference score is obtained by subtracting the threshold from the local score, for each of the parameters. The detection apparatus 10 compares the accumulative score with the reference value (e.g., zero) in size to determine whether the partial series is similar to the search pattern. The detection apparatus 10, thus, can detect whether the partial series included in the parameter series is similar to the search pattern with high accuracy by simple calculation.

The following describes a reason why the detection apparatus 10 in the embodiment can simply calculate whether the partial series included in the parameter series is similar to the search pattern with high accuracy.

As an example of the methods for evaluating the similarity between the partial series and the search pattern, a method may be available for evaluating an accumulative local score, which is a value obtained by calculating the local scores for the respective parameters included in the partial series and accumulating the local parameters in the whole partial series. Another method may also be available for evaluating an average local score, which is a value obtained by normalizing the accumulative local score by the length of the partial series, that is, an average value obtained by dividing the accumulative local score by the number of parameters included in the partial series. The method using the average local score does not cause the score to be changed depending on the length of the partial series (the number of parameters). The method, thus, can more correctly evaluate the similarity than the method using the accumulative local score when the length of the partial series is changed.

The accumulative local score is efficiently calculated using a method (DP matching) based on the dynamic programming. When the search pattern is the HMM, the method (DP matching) based on the dynamic programming is called the Viterbi algorithm. The following describes a method for calculating the accumulative local score on the basis of the Viterbi algorithm. The search pattern is the left-to-right HMM.

The index of the parameter at the start of the partial series is assumed to be s while the index of the parameter at the end of the partial series is assumed to be e. The number of states in the HMM is N. The respective states are represented by indexes 1, 2, . . . , and N. The path (state series Q) in the HMM corresponding to the indexes s to e satisfies the constraint by the following Expressions (11).

$$Q = \{q_s, q_{s+1}, \ldots, q_e\}$$

$$q_s = 1$$

$$q_e = N$$

$$q_\tau \leq q_{\tau+1} \leq q_\tau + 1 \, (s \leq \tau < e) \tag{11}$$

An accumulative local score S(s, e) of the partial series, which is represented by the following Equation (12), is a maximum value in the values obtained by accumulating the local scores of all of the paths in the HMM under the constraint by Expressions (11).

$$S(s, e) = \max_Q \sum_{\tau=s}^{e} \text{score}(\tau, q_\tau) \tag{12}$$

In Equation (12), score($\tau$, $q_\tau$) represents the output probability (local score) of the parameter at the index $\tau$ at the state $q_\tau$. The transition probabilities in the HMM are omitted for simple explanation.

The accumulative local score S(s, e) of the partial series is calculated on the basis of the following Equations (13), which is the recurrence formula, on the basis of the Viterbi algorithm.

$$g(s-1, 0) = 0 \tag{13}$$

$$g(s-1, j) = -\infty \quad (1 < j \leq N)$$

$$g(\tau, 0) = -\infty \quad (s < \tau \leq e)$$

$$g(\tau, j) =$$

$$\max(g(\tau-1, j-1), g(\tau-1, j)) + \text{score}(\tau, j) - \text{THRESHOLD}$$

$$(s \leq \tau \leq e, 0 < j \leq N)$$

$$S(s, e) = g(e, N)$$

When the start and the end of the partial series are fixed, the accumulative local score of the partial series can be efficiently calculated using Equations (13). The average local score is calculated by normalizing the calculated accumulative local score by the length of the partial series.

The following describes detection of a single partial series out of the partial series included in the parameter series. The single partial series has the parameter at the end index t and the accumulative local score or the average local score thereof exceeds the predetermined threshold (THRESHOLD).

Whether the partial series having the parameter at the end index t and satisfying the condition described above is present can be determined by the following Expression (14).

$$\max_{s \leq t} S(s, t) > \text{THRESHOLD} \tag{14}$$

In Expression (14), S(s, t) is the accumulative local score or the average local score.

When S(s, t) is the accumulative local score, Expression (14) is expanded to Expression (15).

$$\max_{s \leq t} \max_Q \sum_{\tau=s}^{t} \text{score}(\tau, q_\tau) > \text{THRESHOLD} \tag{15}$$

By replacing the left side of Expression (15) with the recurrence formula, the following Equations (16) is obtained.

$$g(0, j) = -\infty \quad (0 < j \leq N) \tag{16}$$

$$g(\tau, 0) = 0 \quad (0 \leq \tau \leq T)$$

$$g(\tau, j) = \max(g(\tau-1, j-1), g(\tau-1, j)) + \text{score}(\tau, j)$$

$$(0 < \tau \leq T, 0 < j \leq N)$$

The left side of Expression (15) corresponds to g(t,N) calculated by Equations (16) which represent recurrence formula. The left side of Expression (15), thus, can be efficiently calculated by the dynamic programming.

When S(s, t) is the average local score, Expression (14) is expanded to Expression (17).

$$\max_{s \leq t} \frac{1}{t-s+1} \max_Q \sum_{\tau=s}^{t} \text{score}(\tau, q_\tau) > \text{THRESHOLD} \tag{17}$$

The following Equations (18) is obtained by replacing the left side of Expression (17) with the recurrence formula using the method described in the following document: J. Junkawitsch, L. Neubauer, H. Hoge, G. Ruske, "A new keyword spotting algorithm with pre-calculated optimal thresholds", in Proc. ICSLP, pp. 2067-2070, 1996, for example. In the method described in the document described above, as the value of the local score becomes smaller, the similarity becomes higher. In the following description, a recurrence formula obtained by reversing the sign of the recurrence formula is used to secure consistency of the explanation. The following description is, thus, based on the assumption that as the value of the local score becomes larger, the similarity becomes higher. The terms corresponding to the transition probabilities in the HMM are omitted for simple explanation.

$$\left. \begin{array}{l} g(0, j) = -\infty \\ L(0, j) = 0 \end{array} \right\} \quad (0 < j \leq N) \tag{18}$$

-continued $$\left.\begin{array}{l} g(\tau, 0) = 0 \\ L(\tau, 0) = 0 \end{array}\right\} \quad (0 \le \tau \le T)$$

$$\left.\begin{array}{l} h(\tau, j-1) = \dfrac{L(\tau-1, j-1)g(\tau-1, j-1) + \text{score}(\tau, j)}{L(\tau-1, j-1) + 1} \\ h(\tau, j, 0) = \dfrac{L(\tau-1, j)g(\tau-1, j) + \text{score}(\tau, j)}{L(\tau-1, j) + 1} \\ g(\tau, j) = \max(h(\tau, j, -1), h(\tau, j, 0)) \\ L(\tau, j) = \begin{cases} L(\tau-1, j-1) + 1 & \text{if } h(\tau, j, -1) > h(\tau, j, 0) \\ L(\tau-1, j) + 1 & \text{otherwise} \end{cases} \end{array}\right\}$$

$$(0 < \tau \le T, 0 < j \le N)$$

The left side of Expression (17) corresponds to g(t, N) calculated by Equations (18) which represent recurrence formula. In the recurrence formula (18), the path in which the average local score is at the maximum is selected for each of the parameters at the index τ and at the state j. When g(τ, N) of the parameter at the index τ exceeds the threshold, it is determined that the partial series is similar to the search pattern.

Here, g(τ,N) calculated by the recurrence formula (18) is not always equal to the left side of Expression (17). The following describes a case where g(τ, N) calculated by Equations (18) is not equal to the left side of Expression (17), that is, the average local score calculated by Expression (17) is larger than g(τ, N) calculated by Equations (18).

Two paths having different lengths are supposed to be candidates. One of the paths is a path A having a history of the local score of {0.30, 0.20} while the other one of the paths is a path B having a history of the local score of {0.20} when the index of the parameter is τ and the state is the state (N−1). When the path A is selected, g(τ, N−1)=(0.30+0.20)/2=0.25. When the path B is selected, g(τ, N−1)=0.20. The path A having a higher average local score than that of the path B is selected at this time.

The local score of the parameter at the index (τ+1) at the state N, that is, score(τ+1, N), is supposed to be 0.50. In this case, the average local score g(τ+1, N)=(0.30+0.20+0.50)/3=0.33.

If the path B is selected instead of the path A, the average local score g(τ+1, N)=(0.20+0.50)/2=0.35. The average local score is higher than that when the path A is selected.

When the recurrence formula (18) is used, a problem arises in that the partial series having the average local score exceeding the threshold cannot be detected even though the partial series is present. Such a problem is not limited to the method described in the document described above. In the left side of Expression (17), the normalization calculation using the length of the partial series is present in the function max. Thus, the calculation cannot be strictly performed even though the left side of Expression (17) is simply replaced with the recurrence formula.

In the embodiment, Expression (17) is, thus, modified to the following Expression (19).

$$\max_{s \le t} \frac{1}{t-s+1} \max_Q \sum_{\tau=s}^{t} \text{score}(\tau, q_\tau) > \text{THRESHOLD} \quad (19)$$

$$\Leftrightarrow \max_{s \le t} \frac{1}{t-s+1} \max_Q \sum_{\tau=s}^{t} (\text{score}(\tau, q_\tau) - \text{THRESHOLD}) > 0$$

$$\Leftrightarrow \max_{s \le t} \max_Q \sum_{\tau=s}^{t} (\text{score}(\tau, q_\tau) - \text{THRESHOLD}) > 0$$

In the modification from the first row to the second row in Expression (19), THRESHOLD, which is a constant, in the right side is moved to the left side. In the modification from the second row to the third row in Expression (19), the inside of $$\max_{s \le t}$$

in the left side is divided by (1/(t−s+1)), which is constantly positive. The modification from the second row to the third row in Expression (19) changes a value of the left side, but does not cause a change in comparison result of whether the value exceeds zero, and the modification of expression, thus, holds.

The third row in Expression (19) is the same as Expression (1) that the detection apparatus 10 in the embodiment uses. By replacing the third row in Expression (19) with the recurrence formula, the following Equations (20) is obtained.

$$g(0, j) = -\infty \quad (0 < j \le N) \quad (20)$$

$$g(\tau, 0) = 0 \quad (0 \le \tau \le T)$$

$$g(\tau, j) =$$

$$\max(g(\tau-1, j-1), g(\tau-1, j)) + \text{score}(\tau, j) - \text{THRESHOLD}$$

$$(0 < \tau \le T, 0 < j \le N)$$

Equations (20) is the same as Equations (4) that the detection apparatus 10 in the embodiment uses. In the left side of Expression (19), the normalization calculation using the length of the partial series is not present in the function max. Equations (20), in which the left side of Expression (19) are replaced with the recurrence formula, can strictly calculate the accumulative score g(τ, N). It can be strictly determined whether the partial series having the end parameter at the index τ and the average local score exceeding the threshold is present by comparing the accumulative score with zero.

The detection apparatus 10 in the embodiment can detect whether the partial series included in the parameter series is similar to the search pattern using the expression described above. The detection apparatus 10 in the embodiment, thus, can detect whether the partial series included in the parameter series is similar to the search pattern with high accuracy by simple calculation.

Figure 7:
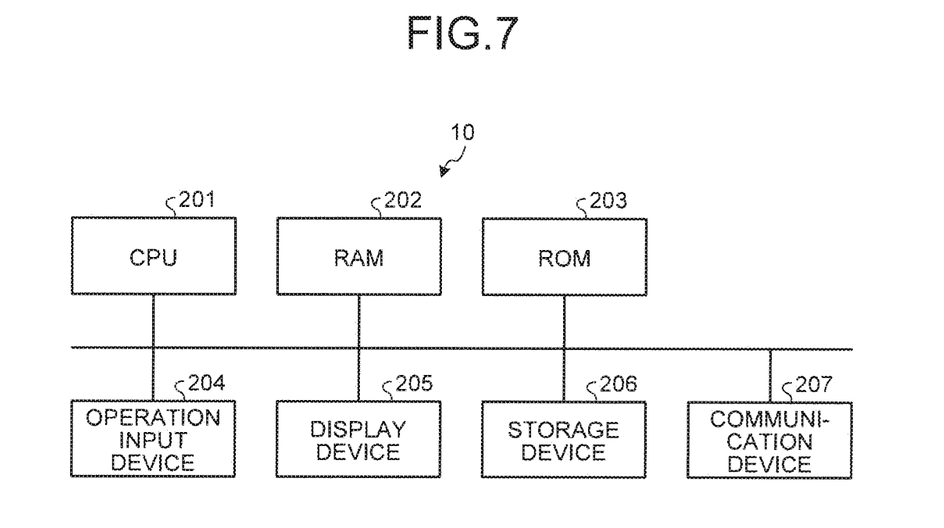
FIG. 7 is a hardware structure diagram of the detection apparatus according to the embodiment.

FIG. 7 is a schematic diagram illustrating an example of a hardware structure of the detection apparatus 10 in the embodiment. The detection apparatus 10 in the embodiment is achieved by an information processing apparatus having the hardware structure illustrated in FIG. 7, for example. The information processing apparatus includes a central processing unit (CPU) 201, a random access memory (RAM) 202, a read only memory (ROM) 203, an operation input device 204, a display device 205, a storage device 206, and a communication device 207. Those components are coupled with a bus.

The CPU 201 is a processor that executes calculation and control processing in accordance with computer programs. The CPU 201 executes various types of processing in cooperation with computer programs stored in the ROM 203 and the storage device 206 using a certain area in the RAM 202 as a working area.

The RAM 202 is a memory such as a synchronous dynamic random access memory (SDRAM). The RAM 202 functions as the working area of the CPU 201. The ROM 203 is a memory that stores therein computer programs and various types of information in a non-rewritable manner.

The operation input device 204 is an input device such as a mouse or a keyboard. The operation input device 204 receives information input by the user's operation as an instruction signal, and outputs the instruction signal to the CPU 201.

The display device 205 is a display such as a liquid crystal display (LCD). The display device 205 displays various types of information on the basis of display signals from the CPU 201.

The storage device 206 writes data to or reads data from a semiconductor storage medium such as a flash memory or an optically or magnetically recordable storage medium. The storage device 206 writes data to or reads data from a storage medium in accordance with control from the CPU 201. The communication device 207 communicates with an external apparatus via a network in accordance with control from the CPU 201.

The computer program executed by the detection apparatus 10 in the embodiment has a module structure including an analysis module, an input module, a search pattern generation module, a local score acquisition module, a difference score calculation module, an accumulative score calculation module, and a determination module. The computer program is loaded in the RAM 202 by the CPU 201 (processor) and executed by the CPU 201, thereby causing the information processing apparatus to function as the analyzer 21, the input unit 22, the search pattern generator 24, the local score acquirer 25, the difference score calculator 26, the accumulative score calculator 27, and the determiner 28.

The detection apparatus 10 is not limited to the structure described above. At least a part of the analyzer 21, the input unit 22, the search pattern generator 24, the local score acquirer 25, the difference score calculator 26, the accumulative score calculator 27, and the determiner 28 may be achieved by a hardware circuit such as a semiconductor integrated circuit.

The computer program executed by the detection apparatus 10 in the embodiment is recorded and provided in a computer-readable recording medium, which may be provided as a computer program product, such as a compact disc read only memory (CD-ROM), a flexible disk (FD), a compact disc recordable (CD-R), and a digital versatile disc (DVD), as an installable or executable file.

The computer program executed by the detection apparatus 10 in the embodiment may be stored in a computer connected to a network such as the Internet, and be provided by being downloaded via the network. The computer program executed by the detection apparatus 10 in the embodiment may be provided or distributed via a network such as the Internet. The computer program executed by the detection apparatus 10 may be preliminarily embedded and provided in a ROM, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection apparatus that detects a partial series similar to a search pattern from a parameter series including a sequence of parameters, the apparatus comprising:
   an analyzer configured to convert a voice signal into the parameter series, wherein the parameters represent an acoustic feature of the voice;
   a local score acquirer configured to acquire a local score representing a likelihood of the parameter in the search pattern for each of the parameters;
   a difference score calculator configured to calculate a difference score by subtracting a threshold from the local score for each of the parameters;
   an accumulative score calculator configured to calculate an accumulative score by accumulating the difference scores; and
   a determiner configured to compare the accumulative score with a reference value in size to determine whether the partial series is similar to the search pattern.

2. The apparatus according to claim 1, wherein the threshold is a boundary value of a value obtained by averaging the local scores of the respective parameters included in the partial series.

3. The apparatus according to claim 2, wherein the reference value is zero.

4. The apparatus according to claim 3, wherein the search pattern is a directed graph in which parameters and output probabilities of the parameters are allocated to states.

5. The apparatus according to claim 4, wherein
   the search pattern is a hidden Markov model in which parameters and output probabilities of the parameters are allocated to states,
   the local score acquirer acquires the output probability corresponding to each of the parameters included in the partial series for each of the states in the hidden Markov model, and outputs the acquired output probability as the local score of the parameter at the state,
   the difference score calculator calculates a subtraction score by subtracting the threshold from the local score corresponding to each of the parameters included in the partial series for each of the states in the hidden Markov model, and
   the accumulative score calculator calculates the accumulative score by accumulating the difference scores of the parameters coinciding with the partial series for each path in the hidden Markov model.

6. The apparatus according to claim 4, wherein the accumulative score calculator sequentially selects the parameters included in the parameter series one by one from the head of the parameter series and calculates the maximum accumulative score for each selected parameter on the basis of a dynamic programming.

7. The apparatus according to claim 6, wherein
the search pattern is a left-to-right hidden Markov model, and
the accumulative score calculator calculates the maximum accumulative score on the basis of the following recurrence formula:

$$g(0, j) = -\infty \quad (0 < j \leq N)$$
$$g(\tau, 0) = 0 \quad (0 \leq \tau \leq T)$$
$$g(\tau, j) = \max(g(\tau-1, j-1), g(\tau-1, j)) + \text{score}(\tau, j) - \text{THRESHOLD}$$
$$(0 < \tau \leq T, 0 < j \leq N)$$

where $\tau$ is a variable that represents an index of the parameter and is an integer larger than zero and equal to or smaller than T, T is an index of the end of the parameter series, j is a variable that represents a state number of the state in the hidden Markov model and is an integer larger than zero and equal to or smaller than N, $g(\tau, j)$ represents an evaluation value of the parameter at the index $\tau$ at a state with the state number j, score $(\tau, j)$ represents the local score of the parameter at the index $\tau$, THRESHOLD represents the threshold, and $\max(g(T-1, j-1), g(\tau 1, j))$ represents a function that selects the larger one of $g(\tau-1, j-1)$ and $g(\tau-1, j)$.

8. The apparatus according to claim 7, wherein the determiner determines whether $g(\tau, N)$ is larger than zero for each selected parameter.

9. The apparatus according to claim 1, further comprising:
an input unit configured to receive a character string;
a model storage configured to store therein an acoustic model in which a phoneme and a hidden Markov model are in association with each other; and
a search pattern generator configured to generate a hidden Markov model corresponding to the character string as the search pattern on the basis of the acoustic model.

10. A method for detecting a partial series similar to a search pattern from a parameter series including a sequence of parameters, the method comprising:
converting a voice signal into the parameter series, wherein the parameters represent an acoustic feature of the voice;
acquiring a local score representing a likelihood of the parameter in the search pattern for each of the parameters;
calculating a difference score by subtracting a threshold from the local score for each of the parameters;
calculating an accumulative score by accumulating the difference scores; and
comparing the accumulative score with a reference value in size and determining whether the partial series is similar to the search pattern.

11. A computer program product comprising a non-transitory computer-readable medium containing a program for detecting a partial series similar to a search pattern from a parameter series including a sequence of parameters, the program causing a computer to execute:
converting a voice signal into the parameter series, wherein the parameters represent an acoustic feature of the voice;
acquiring a local score representing a likelihood of the parameter in the search pattern for each of the parameters;
calculating a difference score by subtracting a threshold from the local score for each of the parameters;
calculating an accumulative score by accumulating the difference scores; and
comparing the accumulative score with a reference value in size and determining whether the partial series is similar to the search pattern.

* * * * *